US009858338B2

United States Patent
Dettinger et al.

(10) Patent No.: US 9,858,338 B2
(45) Date of Patent: Jan. 2, 2018

(54) MANAGED DOCUMENT RESEARCH DOMAINS

(75) Inventors: Richard D. Dettinger, Rochester, MN (US); Frederick A. Kulack, Rochester, MN (US); Kevin G. Paterson, San Antonio, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1610 days.

(21) Appl. No.: 12/771,086

(22) Filed: Apr. 30, 2010

(65) Prior Publication Data

US 2011/0270856 A1 Nov. 3, 2011

(51) Int. Cl.
*G06F 17/30* (2006.01)

(52) U.S. Cl.
CPC .. *G06F 17/30728* (2013.01); *G06F 17/30882* (2013.01)

(58) Field of Classification Search
CPC ......... G06F 17/30672; G06F 17/30616; G06F 17/30011; G06F 17/30604; G06F 17/30728; G06F 17/30705; G06F 17/3089; G06F 17/30882; G06F 17/30864; G06F 17/30684; G06F 17/30731; G06F 17/30734
USPC .................................................. 707/758, 802
See application file for complete search history.

(56) References Cited

U.S. PATENT DOCUMENTS

| | | | |
|---|---|---|---|
| 6,263,335 B1 | 7/2001 | Paik et al. | |
| 6,289,342 B1 | 9/2001 | Lawrence et al. | |
| 6,502,081 B1 | 12/2002 | Wiltshire, Jr. et al. | |
| 7,313,515 B2 | 12/2007 | Crouch et al. | |
| 7,493,333 B2* | 2/2009 | Hill et al. | |
| 7,860,706 B2 | 12/2010 | Abir | |
| 7,904,401 B2 | 3/2011 | Dolby et al. | |
| 8,065,290 B2 | 11/2011 | Hogue | |
| 8,112,369 B2 | 2/2012 | Abramson | |
| 8,335,754 B2 | 12/2012 | Dawson et al. | |
| 2002/0077806 A1* | 6/2002 | Tarbouriech | G06F 17/271 704/4 |
| 2003/0028503 A1* | 2/2003 | Giuffrida et al. | 707/1 |
| 2004/0059736 A1 | 3/2004 | Willse et al. | |
| 2004/0243556 A1* | 12/2004 | Ferrucci | G06F 17/30622 707/999.003 |
| 2004/0243560 A1* | 12/2004 | Broder | G06F 17/30622 707/999.003 |
| 2004/0243645 A1* | 12/2004 | Broder | G06F 17/30616 707/999.2 |
| 2005/0108630 A1* | 5/2005 | Wasson | G06F 17/241 707/E17.084 |
| 2005/0203924 A1 | 9/2005 | Rosenberg | |
| 2005/0267871 A1* | 12/2005 | Marchisio | G06F 17/30672 707/999.003 |
| 2006/0053135 A1 | 3/2006 | Beaumont et al. | |

(Continued)

*Primary Examiner* — Ashish K Thomas
*Assistant Examiner* — Rezwanul Mahmood
(74) *Attorney, Agent, or Firm* — Patterson + Sheridan, LLP (57) ABSTRACT

Techniques are disclosed for improving the quality and durability of citations used within research documents. A method and apparatus may be sued to enhance the ability of researches to collaborate (or to simply be alerted) when the substance of a reference cited in one research document changes in a way that may conflict with how that reference is used in the citing document. For example, changes in cited reference may undermine (or enhance) the conclusions of a research paper stored in the managed repository.

21 Claims, 5 Drawing Sheets

(56) References Cited

U.S. PATENT DOCUMENTS

| | | |
|---|---|---|
| 2006/0053382 A1 | 3/2006 | Gardner et al. |
| 2007/0112819 A1* | 5/2007 | Dettinger et al. ............ 707/101 |
| 2007/0143322 A1* | 6/2007 | Kothari et al. ............... 707/101 |
| 2008/0133213 A1 | 6/2008 | Pollara |
| 2008/0249764 A1* | 10/2008 | Huang ................ G06F 17/2785 704/9 |
| 2008/0320579 A1* | 12/2008 | Rollins et al. .................. 726/10 |
| 2009/0044200 A1* | 2/2009 | Bordia ................ G06Q 10/107 719/314 |
| 2009/0144609 A1 | 6/2009 | Liang et al. |
| 2009/0287678 A1* | 11/2009 | Brown .............. G06F 17/30654 707/999.005 |
| 2010/0088262 A1 | 4/2010 | Visel et al. |
| 2010/0114561 A1 | 5/2010 | Yasin |
| 2010/0228693 A1 | 9/2010 | Dawson et al. |
| 2011/0270856 A1 | 11/2011 | Dettinger et al. |
| 2012/0221583 A1 | 8/2012 | Kulack et al. |

\* cited by examiner

MANAGED DOCUMENT RESEARCH DOMAINS

BACKGROUND

Field

Embodiments of the invention generally relate to tools to improve the quality and durability of citations used within research documents. More particularly, embodiments of the invention relate to techniques for providing managed document research domains.

Description of the Related Art

Many researchers and research institutions are moving to publishing original research and data as well as study/reference materials online. As a result, Internet search engines may be used to access a broad variety of original research. Because the Internet contains such vast amounts of information that may be searched quickly and efficiently, researchers and academics are using the Internet more and more to conduct their research.

Research results are frequently published in an electronic research document and contain citations to documents/data used by the researcher. Readers of the research document may use the citations to verify the accuracy of the results presented in a research document as well as to gain more information about the subject to which the citation pertains. Citations to documents in the electronic research document may themselves be references to documents accessible through a network such as the Internet (e.g., citations are frequently formatted as a simple http URL). However, while the Internet (and networks generally) provide a convenient means of storing and accessing electronic documents, the Internet is a fluid and changing environment. Remotely located electronic documents may be moved from one location on a web site to another or taken down, the server storing an electronic document may change addresses or crash, and the company or entity providing the electronic document may go out of business or close the web site containing the electronic document. Each situation may result in a temporary or permanent loss of the information being cited in a research document.

This is a problem for the continuing progress of medical and scientific research, because other researchers looking to recreate experiments, or expand on the research of others can no longer find the referenced materials. In addition to becoming unavailable, remotely located documents may be changed or updated by the author or administrator of the remote document. A researcher may create a research document which contains reasoning and conclusions drawn from a cited document. If the cited document is changed or updated, the reasoning and conclusions drawn from that document may become incorrect without the researcher's knowledge. Additionally, persons reading the research document, upon referring to the changed remote document, may think that the researcher has mischaracterized the cited document or drawn incorrect conclusions from the cited document, reflecting negatively upon both the research and the researcher. Further still, while the publishing and peer-review process has been indisputably successful, research is performed on a global scale, and frequently, one researcher may not even know who is working on the same or similar problems (possibly reaching conflicting results), let alone who may be relying on (or criticizing) their research.

SUMMARY

One embodiment of the invention provides a method of storing a document in a managed research domain. The method may generally include receiving a primary research document to store in a repository provided by the managed research domain and extracting one or more links from the primary research document. Each extracted link references a cited document. Each cited document may be evaluated using a set of one or more annotators to derive a first collection of one or more assertions regarding the cited document. The method may also include evaluating the primary research document using the set of one or more annotators to derive a second collection of one or more assertions and storing the primary research document, the first collection of assertions, and the second collections of assertions in the repository provided by the managed research domain.

Another embodiment of the invention includes a computer-readable storage medium containing a program which, when executed, performs an operation for storing a document in a managed research domain. The operation itself may generally include receiving a primary research document to store in a repository provided by the managed research domain and extracting one or more links from the primary research document. Each extracted link may reference a cited document. Each cited document may be evaluated using a set of one or more annotators to derive a first collection of one or more assertions regarding the cited document. The operation may also include evaluating the primary research document using the set of one or more annotators to derive a second collection of one or more assertions and storing the primary research document, the first collection of assertions, and the second collections of assertions in the repository provided by the managed research domain.

Still another embodiment of the invention includes a system having a processor, a storage repository, and a memory storing a monitor/analyzer tool, which when executed on the processor is configured to perform an operation. The operation itself may generally include receiving a primary research document to store in a repository provided by the managed research domain and extracting one or more links from the primary research document. Each extracted link may reference a cited document. Each cited document may be evaluated using a set of one or more annotators to derive a first collection of one or more assertions regarding the cited document. The operation may also include evaluating the primary research document using the set of one or more annotators to derive a second collection of one or more assertions and storing the primary research document, the first collection of assertions, and the second collections of assertions in the repository provided by the managed research domain.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention generally provide techniques for improving the quality and durability of citations used within research documents. Further, embodiments of the invention enhance the ability of researches to collaborate (or to simply be alerted) when the substance of a reference cited in one research document changes in a way that may conflict with how that reference is used in the citing document. For example, changes in cited reference may undermine (or enhance) the conclusions of a research paper stored in the managed repository.

When a user submits research content to a managed research domain (e.g., a paper to be published in a journal backed by the managed research domain), a variety of semantic analysis processes may be used to evaluate the content of the submitted document (and the content of references cited to by the submitted document). For example, one embodiment of the invention provides a universal repository for papers used in professional research within a specific research domain. Researchers may submit a copy of a primary research work to the repository. In a particular embodiment, an extension to document generation software (e.g., a plug-in component for a word processor or specialized content creation tool) may be used to submit a given research work to the repository.

Upon submission to the repository, the primary research document may be evaluated using a variety of both general and domain specific semantic analysis tools. The tools may parse the document to identify both lexical and logical content. In one embodiment, a given research/repository domain is represented using one or more annotators configured to parse and evaluate the content of the primary research document, relative to that research domain. Using the appropriate domain specific annotators is important because what a term means in one domain (e.g., life sciences) may not be consistent with the use of the same term in another domain (e.g., weather patterns and climatology research).

In one embodiment, e.g., a first annotator may normalize the terms used in a document to a common ontology defined for a research domain. Once normalized, additional annotators may evaluate the research document to identify assertions made by the primary research document based on the normalized terms. Examples of assertions that may be identified by annotators include assertions of causation, correlation, existence, truth or falsity, etc relative to a particular concept (or concepts) from the ontology. Once identified, the assertions may be stored in a database maintained by the repository.

Further, assertions made in the primary research document may frequently include references to supporting research (e.g., references to other documents in the form of a citation or link). In one embodiment, documents referenced in the primary research document may be obtained, parsed, and evaluated using the same annotators used to evaluate the primary research document, resulting in a set of assertions for each cited or linked document. The repository may evaluate the assertions derived from the primary research document to identify whether the supporting documents support a given assertion. That is, the semantic meaning of the primary and supporting documents derived by the annotators can be compared to one another, allowing their relative commonality to be understood. This can be as simple as recognizing the degree to which documents use similar semantic concepts or quite complex, e.g., allowing for the negation assertion of an ontological concept in one document and positive assertion of the same ontological concept in another document to be identified. Further, this can significantly assist researchers in finding other work they should find interesting given a piece of work they have researched. For example, in one embodiment, the assertions made may the annotators for a primary (or supporting) document may be used to identify other works within the managed repository that make the same (or contradictory) assertion for the same ontological concept. Doing so may allow researchers to discover previously unknown peer research relevant to their field of expertise.

Further, once a document is a member of the research domain, it becomes monitored by the research domain. Any changes to the document (i.e., a subsequent version) are recognized on a regular basis and can be acted upon. When a document changes, the new version is brought into the repository and analyzed. How the document changed can be processed and a number of actions can be taken. If the changes are minor or if the changes do not relate to an assertion made in a document citing the changed one, perhaps nothing is done. If extensive or conflicting changes occur, the originator of the document can be requested to comment on the changes to the research (drive action of the repository). But more importantly, owners of documents referring to the changed one, and owners of documents that are semantically very similar, can be notified and their comments (or new documents) can be collected.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access the managed storage repository as well as the related document annotators and data available in the cloud.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
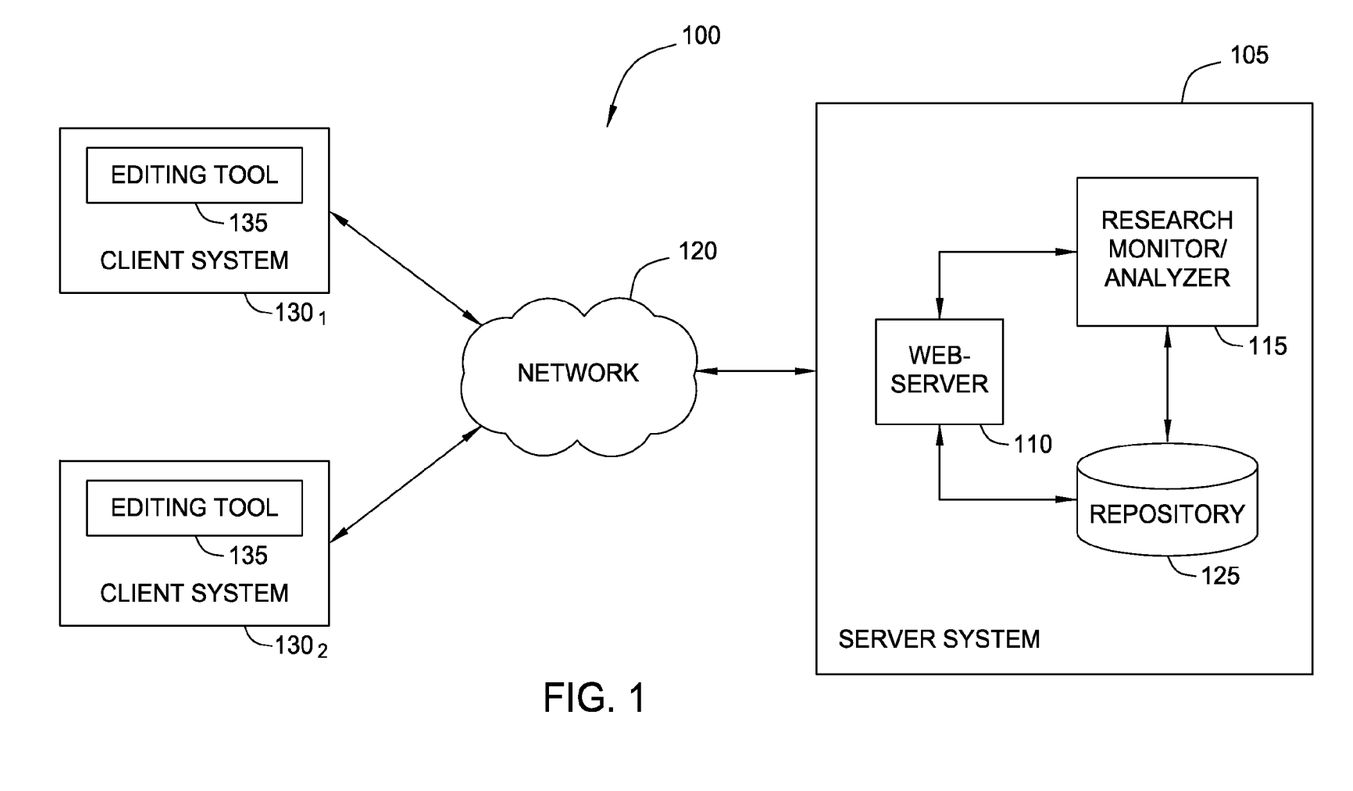
FIG. 1 illustrates a computing infrastructure configured to provide a managed document research domain, according to one embodiment of the invention.

FIG. 1 illustrates a computing infrastructure 100 configured to provide a managed document research domain, according to one embodiment of the invention. As shown, the computing infrastructure 100 includes a server computer system 105 and a plurality of client systems $130_{1-2}$, each connected to a communications network 120, and the server computer 105 includes a web server 110, a research document monitor/analyzer tool 115 and a research document repository 125.

In one embodiment, client systems $130_{1-2}$ include an editing tool 135 configured to communicate over the network 120 with the monitor/analyzer tool 115. The editing tool 135 generally allows a researcher to compose a research document. Accordingly, the editing tool 135 is representative of a broad variety of software applications such as a word processor, spreadsheet editor, HTML editor, and other authoring tools. In one embodiment, the editing 135 tool may be configured to allow a document author to submit it to the research document repository 125 (generally referred to as a primary research document). For example, the editing tool 135 may be configured to interact with the web-server 110 to identify and upload a given research document to the server system 105. Alternatively, the submission process may be independent of the editing tool 135. For example, the web server 110 may provide an interface to a web application that allows users to identify and upload a research document to the server system 105. Once received, the web server 110 may pass an uploaded document to the monitor/analyzer tool 115.

The monitor/analyzer tool 115 is configured to store a document uploaded to the server 105 in the repository 125. As described in greater detail below, the monitor/analyzer tool 115 may also analyze a primary research document uploaded to the server system 105 to derive a set of semantic assertions. Further, the monitor/analyzer tool 115 may identify each citation within the primary research document made to other documents. Once identified, the monitor/analyzer tool 115 may obtain a copy of each such cited reference as well as derive a set of semantic assertions for each cited reference. Once done, the assertions for the primary research document may be compared with the assertions for the cited document to identify whether the assertions made by the primary research document are consistent with the assertions for the cited documents.

Further, the monitor/analyzer tool may schedule a periodic re-evaluation of the primary research document uploaded to the server 105. Doing so allows the monitor/analyzer tool 115 to keep the research citations in the uploaded document up to date. This is particularly useful when a primary research document links to or references supporting documents from online sources or based on ongoing research. For example, if monitor/analyzer tool 115 identifies an assertion in the primary research document that cites a tentative or preliminary conclusion of ongoing research for support, the preliminary conclusions may change such that the assertion in the primary document is no longer supported. In such cases, the monitor/analyzer tool 115 may identify this change, and alert the primary author.

Further, the monitor/analyzer tool 115 may compare the assertions of the primary research document with assertions derived for a corpus of documents already in the repository 125. If conflicting assertions are found, the monitor/analyzer tool 115 may notify the authors of two or more relevant documents and allow each one to comment on the research works of others. Doing so may enhance the general peer-review process by connecting different researches working in the same domain.

Figure 2:
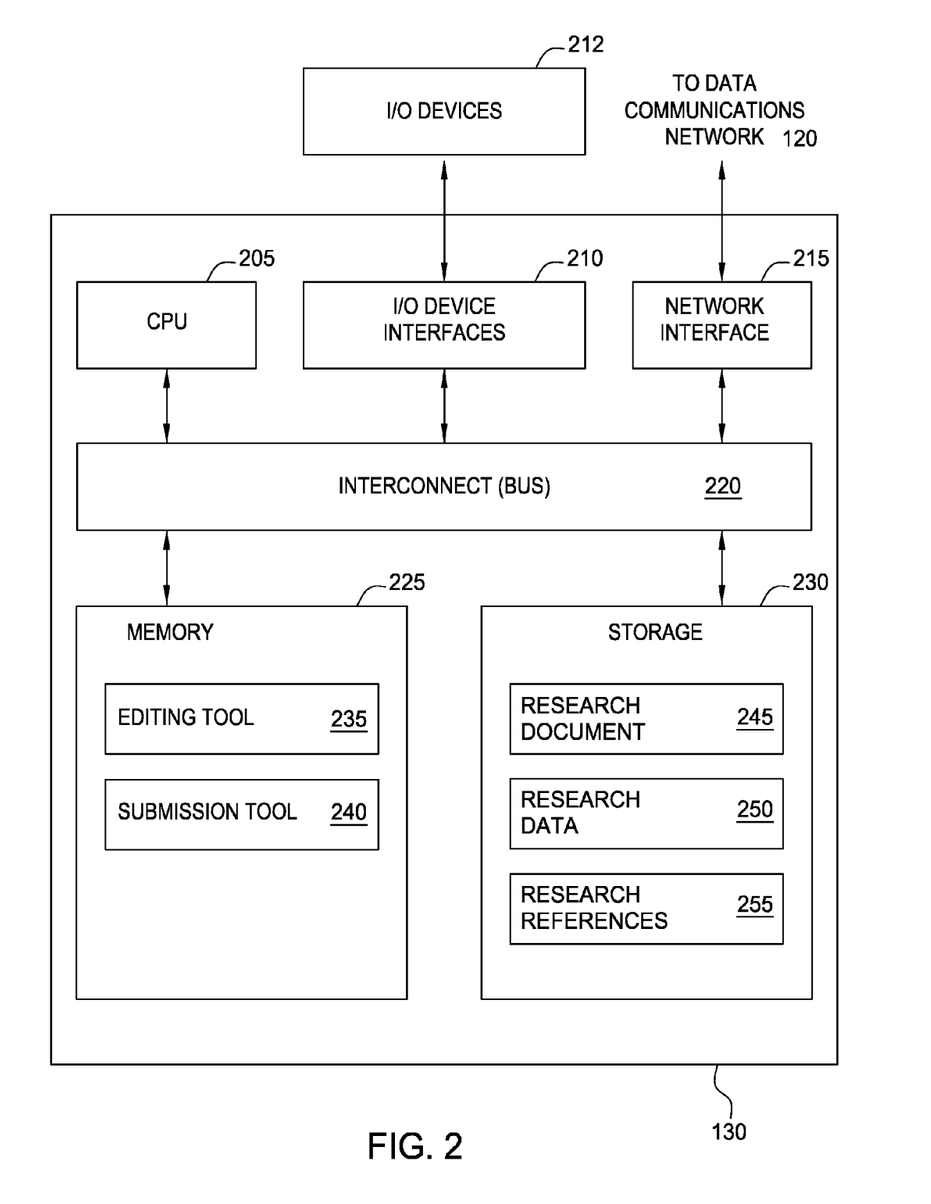
FIG. 2 is a more detailed view of the client computing system of FIG. 1, according to one embodiment of the invention.

FIG. 2 is a more detailed view of the client computing system of FIG. 1, according to one embodiment of the invention. As shown, the client computing system 130 includes, without limitation, a central processing unit (CPU) 205, a network interface 215, an interconnect 220, a memory 225, and storage 230. The computing system 130 may also include an I/O device interface 210 connecting I/O devices 212 (e.g., keyboard, display and mouse devices) to the computing system 105.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive, may store non-volatile data.

Illustratively, the memory 225 includes an editing tool 235 and a submission tool 240. As noted above, the editing tool 235 provides a software application which allows a user to compose a research document and the submission tool 240 provides a software application which allows the user to submit such a research document to the managed document research domain.

In this example, the storage 230 includes a research document, research data 250 and research references 255. The research document 245 generally corresponds to a primary research document composed using the editing tool 235 and submitted to the managed document research domain using the submission tool 240. Research data 250 corresponds to research data included in the research document 245. Research references 255 correspond to links, citations, or any other information, however styled in the research document 245, which reference another document. The research references 255 may correspond to published documents, e.g., articles published in a research journal, but may also be documents (or other data) available in an online format (e.g., web-pages, PDF documents, or other online presentations).

Figure 3:
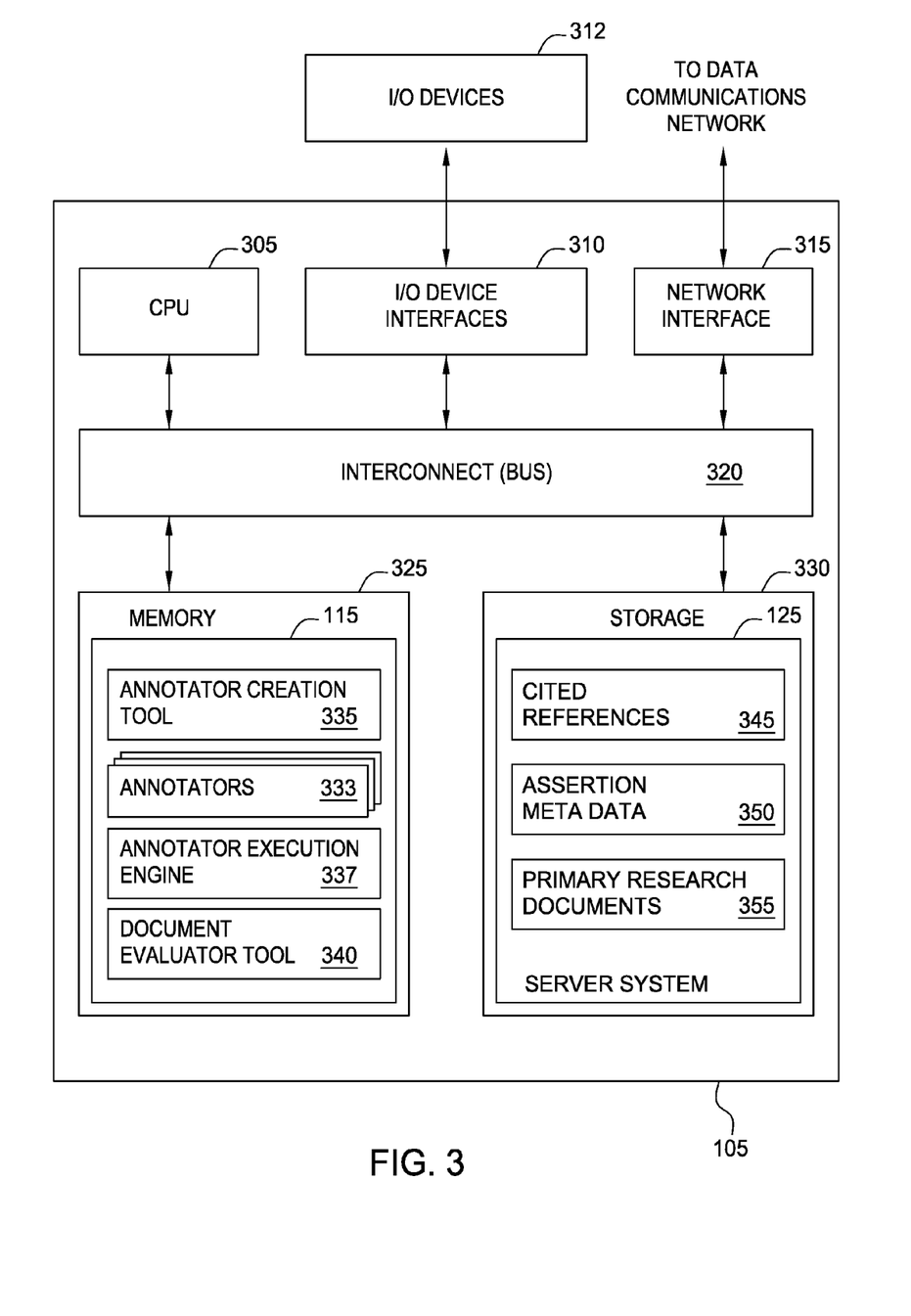
FIG. 3 is a more detailed view of the server computing system of FIG. 1, according to one embodiment of the invention.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, floppy disc drives, tape drives, removable memory cards, optical storage, network attached storage (NAS), or a storage area-network (SAN).

The memory 325 stores the monitor/analyzer tool 115 from FIG. 1, and the storage 345 includes the repository 125 from FIG. 1. Illustratively, the monitor/analyzer tool 115 includes an annotator creation tool 335, a set of annotators 333, an annotator execution engine 337 and a document evaluation tool 340. The storage 345 includes a primary research document 355, a set of cited references 345, and assertions metadata 350. Of course, one of ordinary skill in the art will recognize that the functionality provided by the components of the monitor/analyzer tool 115 and the storage 345 included the repository 125 could be implemented in a variety of ways other than as shown in FIG. 3. Further, the functionality of these components could be distributed across multiple computing systems, e.g., using a variety of available web-services or other distributed computing frameworks.

The annotator creation tool 335 provides an application which allows users to compose one of the annotators 333. In one embodiment each of the annotators 333 provide a piece of executable (or interpretable) code that creates annotations describing some aspect of content for a document being evaluated. Together, a set of annotators 333 may build on top of one another to derive assertions about a research document. For example, a first annotator 333 may parse a research document to identify each sentence, then, a second annotator 333 could tag the words/phrases in the identified sentences according to parts-of-speech (e.g., nouns/verbs/adjectives). Then, a declarative or disambiguation annotator 333 could evaluate the results of the previous two annotators 333. Such an annotator 333 could normalize elements of the research document to an ontology related to a particular research domain. For example, one set of annotators 333 may be used to evaluate documents related to research in the medical sciences, while another set of annotators 333 may be composed to evaluate documents related to research in climatology (or other field of research).

Once normalized to a given ontology, additional annotators 333 may be used to identify assertions made by the primary research document, based on the normalized terms. As noted above, examples of assertions that may be identified by an annotator 333 include assertions of causation, correlation, existence, truth or falsity, etc relative to a particular normalized term, concept, or concepts from the ontology. Further, another one of the annotators 333 may be configured to identify references or links to other documents as well as identify what assertions may be supported by one of the references, links, or citations. Once identified, the assertions may be stored as assertion metadata 350 in the repository 125.

In one embodiment, the annotators 333 may be executed using an annotator execution engine 337. For example, in a particular embodiment, the annotators 333 and the annotator execution engine 337 may be configured according to the publically available Unstructured Information Management Architecture (UIMA). UIMA provides a collection of component software architecture for the development, discovery, composition, and deployment of multi-modal analytics for the analysis of unstructured information (e.g., a primary research document 355) as integrated with search technologies. Of course, other architectures or frameworks for evaluating unstructured information may be used.

The document evaluator tool 340 may be configured to receive the primary research document 355, e.g., from a user interacting with the editing tool 235 and submission tool 240 of FIG. 2 and invoke the appropriate set of annotators 333 for execution on the primary research document. As noted above, one of the annotators 333 may be configured to identify references, links, or citations in the primary research documents 355. In such a case the document evaluator tool 340 may be configured to obtain a copy of the material referenced, linked to or cited by the primary research document 355. The document evaluator tool 340 may store such material as cited references 345 in the repository 125. Further, the document evaluator tool 340 could evaluate the cited references 125 using the same set of annotators 333 used to evaluate the primary research document 355. Once both the primary research document 355 and the cited references are evaluated by the annotators 333, the resulting assertions can be stored in the repository 125 as assertion metadata 350 and compared for consistency (or conflict).

Further still, the document evaluator tool 340 may schedule a time for the results of the annotators evaluation of the primary research document 355 and the cited references 345 to be updated. As noted above, doing so allows the changes to cited references 345 that result in changes to the assertions derived by the annotators to be evaluated for conflicts. This may be particularly useful when a primary research document 355 links to a cited reference 345 from an online source or a cited reference 345 that presents the results or conclusions from ongoing research.

Figure 4:
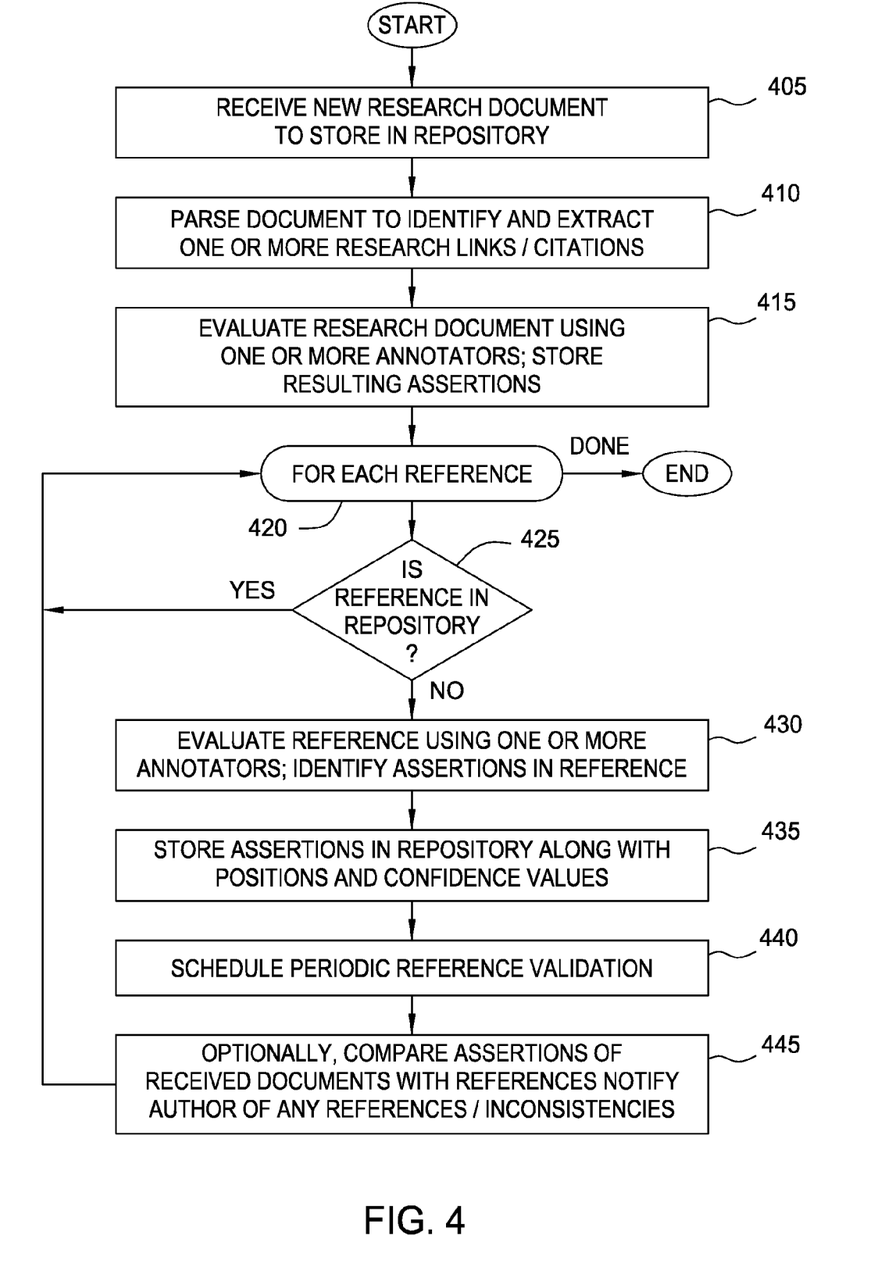
FIG. 4 illustrates a method for adding a research document to a managed research domain, according to one embodiment of the invention.

FIG. 4 illustrates a method 400 for adding a research document to a managed research domain, according to one embodiment of the invention. As shown, the method begins at step 405 where the document evaluator tool receives a new primary research document to store in the managed repository. As noted above, a user may interact with a document editing tool (or other software) to identify and upload a document to the computer server hosting the managed research domain.

At step 410, the document evaluator tool may invoke an annotator configured to parse the received document to identify and extract one or more links, citations, or references to other documents made by the document received at step 405. At step 415, the document evaluator tool 340 may evaluate the research document using one or more annotators. As described above, the annotators may derive a set of assertions relative to the content of the document, normalized to an ontology for a given research domain. The resulting assertions may be stored in the managed research domain.

At step 420 a loop begins where each document linked, referenced, or cited by the primary research document recited at step 405 is evaluated. First at step 425, the document evaluator tool may determine whether a copy of a given cited reference is present in the repository of the managed research domain. If the document is already in the repository (and has been evaluated by the appropriate set of annotators), the method returns to step 420 to select another document for evaluation.

If a given cited reference is not in the repository, then a copy may be obtained and evaluating using a set of annotators. As noted above, the document may be evaluated using the same set of annotators used to evaluate the primary research document at step 415. Accordingly, the evaluations results in a set of assertions regarding the cited reference. At step 435, the resulting assertions may be stored in the repository of the managed research domain. In addition to storing the assertions themselves, the relevant portion or position within the document on which a given is assertion is based may be stored as well. Doing so may help the managed research domain identify whether a change to a cited reference is relative to a given assertion.

In one embodiment, one or more of the assertions derived for both the research document received at step 405 and for the cited reference may include a confidence value or metric. Such a metric may be derived by one of the annotators and provide a measure of how strongly an assertion is made by the document (or alternatively, a confidence measure indicating how strongly the annotator believes the document actually makes a given assertion).

At step 440, the document evaluator tool may schedule a periodic reference validation for the cited reference. As noted above, using the annotators to periodically re-evaluate the references used to support the assertions of the primary research document may ensure the continued availability of the references, and depending on how a document has changed, identify whether any of the assertions in a reference might conflict with an assertion made in the primary research, following a change. At step 445, the document evaluator tool may compare the assertions of the received document with the assertions of the reference. If any conflicts or inconsistencies are identified, then the document evaluator tool may notify the content author.

Additionally, one of skill in the art will note that the evaluation process of method 400 may be performed recursively. That is, a given cited reference may itself be treated as a primary research document. In such a case, the references cited by the cited reference may be obtained and evaluated in the manner described above for method 400.

Figure 5:
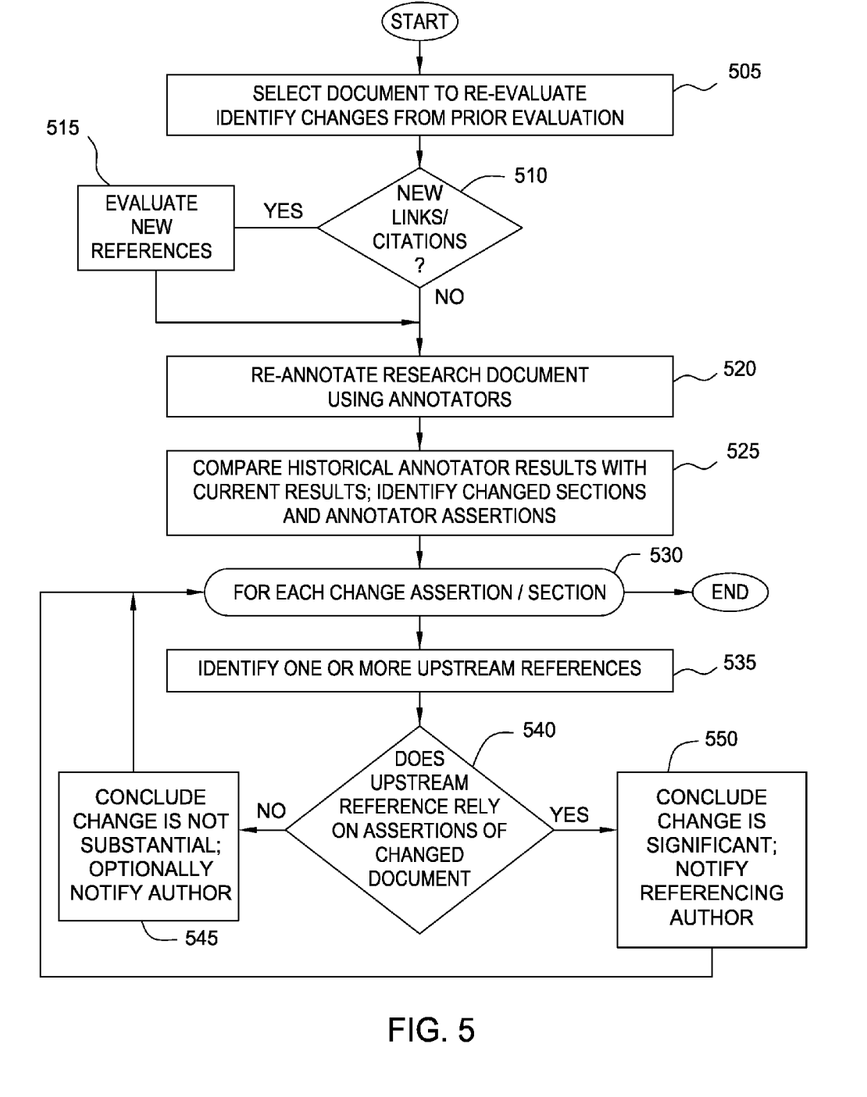
FIG. 5 illustrates a method for maintaining citation durability for documents in a managed research domain, according to one embodiment of the invention.

FIG. 5 illustrates a method 500 for maintaining citation durability for documents in a managed research domain, according to one embodiment of the invention. As shown, the method 500 begins at step 505 where a document is selected for revaluation. The selected document may be evaluated to identify changes to that may have occurred since a previous evaluation. For example, the document may be one that is cited to, linked to by, or otherwise referenced in a primary research document. As described above, such a document may be stored as a cited reference in a repository maintained by the managed research domain. And the managed research domain may have obtained a copy of the document when the primary research document was submitted to the primary research domain for evaluation. Thus, at step 505, the document evaluator tool may obtain a current copy of the document and compare the two to identify any changes.

At step 515, the document evaluator tool may determine whether any new references are cited by the document being evaluated. If so, at step 515, the new references may be evaluated by the annotators using the techniques described above. At step 520, the document may be re-annotated using the annotators, resulting in a new set of assertions for the document. At step 525, the document evaluator tool may compare a historical set of annotator result with the current results obtained at step 520 to identify changes in the previous set of assertions derived for the document with the assertions derived for the current copy. Additionally, the document evaluator tool may identify changed sections of the document and any changed, new, or deleted assertions made by the annotators.

Once identified, a loop begins at step 530 to determine whether any of the changes assertions impact an assertion of a primary research document. The loop is used to evaluate each changed/assertion identified at step 525. First at step 535, the document evaluator tool may identify any "upstream" references for the document being re-evaluated. That is, any references by other documents to the one selected at step 505. For example, the document evaluator tool may identify a primary research document within the managed research domain that cites the document selected at step 505 to be reevaluated. At step 540, the document evaluator tool may determine whether the upstream document makes reference to the changed assertions or changed sections of the document selected at step 505.

If not, then the change is not substantial for the "upstream" work (i.e., for a primary research document which cites to the document selected at step 505). However, the author of the primary research document may be notified. Alternatively, if the primary research document does make reference to the changed assertions of the document, then the change may be significant to the author of the primary research document. In such a case, the document evaluator tool may perform a variety of actions. For example, in addition to prompting the author document being selected at step 505 to comment on the changes, the managed research domain may contact the changed document and the primary research document (i.e., the one citing the changed document) and allow both authors to comment. Of course, a variety of other programmatic workflow actions could be performed.

Thus, advantageously, embodiments of the invention generally provide techniques for improving the quality and durability of citations used within research documents. Further, embodiments of the invention enhance the ability of researches to collaborate (or to simply be alerted) when the substance of a reference cited in one research document changes in a way that may conflict with how that reference is used in the citing document. For example, changes in cited reference may undermine (or enhance) the conclusions of a research paper stored in the managed repository.

While the foregoing is directed to embodiments of the present invention, other and further embodiments of the invention may be devised without departing from the basic scope thereof, and the scope thereof is determined by the claims that follow.

What is claimed is:

1. A computer-implemented method to monitor documents in a managed research domain to determine whether changes in cited content undermine semantic conformity with citing content, the computer-implemented method comprising:

receiving a primary research document to store in a repository provided by the managed research domain;

extracting one or more citations from the primary research document, wherein each extracted citation references a respective one of one or more cited documents;

for each cited document, evaluating content of the cited document using a set of annotators to derive a respective collection of cited assertions from the content of the cited document, wherein the set of annotators includes at least three of: (i) a normalization annotator normalizing the terms in the primary research document and the terms in the one or more cited documents to predefined terms used in a common ontology specific to the managed research domain; (ii) a sentence annotator identifying each sentence in a given document selected from: the primary research document and the one or more cited documents; (iii) a parts-of-speech annotator tagging words in each identified sentence and according to parts-of-speech; (iv) a support annotator identifying references to any documents and further identifying which assertions are supported by the identified references; and (v) a disambiguation annotator evaluating and reconciling results of at least two of the set of annotators;

evaluating content of the primary research document using the set of annotators to derive a collection of citing assertions from the content of the primary research document;

storing the primary research document, each collection of cited assertions, and the collection of citing assertions in the repository provided by the managed research domain;

monitoring for changes to cited content in each cited document, including changes to cited content a first cited document;

for each monitored change to the cited content in the first cited document, determining, by operation of one or more computer processors and based on the derived collections of cited assertions and citing assertions, whether the respective monitored change undermines semantic conformity of the cited content in the first cited document with corresponding, citing content in the primary research document;

upon determining that a first of the monitored changes to the cited content in the first cited document undermines semantic conformity with the citing content, designating the citing content as potentially lacking semantic conformity with the changed, cited content, by annotating the citing content in the primary research document without annotating the changed, cited content in the first cited document;

in response to the designation, generating an alert identifying the citing content and indicating that semantic conformity is undermined;

outputting the alert to an author of the primary research document in order to prompt the author to reapprove at least the citing content in the primary research document in light of the changed, cited content in the first cited document; and removing the designation from the primary research document after receiving, from the author, an indication of reapproval of the citing content in the primary research document.

2. The computer-implemented method of claim 1, wherein at least one of the set of annotators normalizes terms in the primary research document and terms in the one or more cited documents to the common ontology.

3. The computer-implemented method of claim 2, wherein determining that the first monitored change to the cited content undermines semantic conformity with the citing content comprises:

comparing the assertions in the collection of cited assertions of the cited document containing the cited content, and the assertions in the collection of citing assertions to identify any significant conflicts between the collection of cited assertions of the cited document and the collection of citing assertions.

4. The computer-implemented method of claim 3, further comprising scheduling each of the one or more cited references for a subsequent re-evaluation at a designated time.

5. The computer-implemented method of claim 4, wherein a given one of the cited documents comprises a cited research paper not written by the author of the primary research paper, the computer-implemented method further comprising:

at the designated time, for the given one of the cited documents, re-evaluating the cited reference using the set of annotators to derive an updated collection of cited assertions regarding the cited reference;

comparing the assertions in the collection of cited assertions and the assertions in the updated collection of cited assertions to identify any conflicts between the collection of cited assertions and the updated collection cited of assertions; and in response to identifying a conflict and without requiring any user input, programmatically notifying the author of the primary research document that the cited research paper has changed.

6. The computer-implemented method of claim 5, wherein the set of annotators are composed according to an Unstructured Information Management Architecture (UIMA), wherein the method further comprises notifying the author of the cited research paper without requiring any user input specifying to notify the author of the cited research paper.

7. A non-transitory computer-readable medium to monitor documents in a managed research domain to determine whether changes in cited content undermine semantic conformity with citing content, the non-transitory computer-readable medium containing a program executable to perform an operation comprising:

receiving a primary research document to store in a repository provided by the managed research domain;

extracting one or more citations from the primary research document, wherein each extracted citation references a respective one of the one or more cited documents;

for each cited document, evaluating content of the cited document using a set of annotators to derive a respective collection of cited assertions from the content of the cited document, wherein the set of annotators includes at least three of: (i) a normalization annotator normalizing the terms in the primary research document and the terms in the one or more cited documents to predefined terms used in a common ontology specific to the managed research domain; (ii) a sentence annotator identifying each sentence in a given document selected from: the primary research document and the one or more cited documents; (iii) a parts-of-speech annotator tagging words in each identified sentence and according to parts-of-speech; (iv) a support annotator identifying references to any documents and further identifying which assertions are supported by the identified references; and (v) a disambiguation annotator evaluating and reconciling results of at least two of the set of annotators;

evaluating content of the primary research document using the set of annotators to derive a collection of citing assertions from the content of the primary research document;

storing the primary research document, each collection of cited assertions, and the collection of citing assertions in the repository provided by the managed research domain;

monitoring for changes to cited content in each cited document, including changes to cited content a first cited document;

for each monitored change to the cited content in the first cited document, determining, by operation of one or more computer processors when executing the program, and based on the derived collections of cited assertions and citing assertions, whether the respective monitored change undermines semantic conformity of the cited content in the first cited document with corresponding, citing content in the primary research document;

upon determining that a first of the monitored changes to the cited content in the first cited document undermines semantic conformity with the citing content, designating the citing content as potentially lacking semantic conformity with the changed, cited content, by annotating the citing content in the primary research document without annotating the changed, cited content in the first cited document;

in response to the designation, generating an alert identifying the citing content and indicating that semantic conformity is undermined;

outputting the alert to an author of the primary research document in order to prompt the author to reapprove at least the citing content in the primary research document in light of the changed, cited content in the first cited document; and removing the designation from the primary research document after receiving, from the author, an indication of reapproval of the citing content in the primary research document.

8. The non-transitory computer-readable medium of claim 7, wherein at least one of the set of annotators normalizes terms in the primary research document and terms in the one or more cited documents to the common ontology.

9. The non-transitory computer-readable medium of claim 8, wherein determining that the first monitored change to the cited content undermines semantic conformity with the citing content comprises:

comparing the assertions in the collection of cited assertions of the cited document containing the cited content, and the assertions in the collection of citing assertions to identify any significant conflicts between the collection of cited assertions of the cited document and the collection of citing assertions.

10. The non-transitory computer-readable medium of claim 9, wherein the operation further comprises scheduling each of the one or more cited references for a subsequent re-evaluation at a designated time.

11. The non-transitory computer-readable medium of claim 10, wherein a given one of the cited documents comprises a cited research paper not written by the author of the primary research paper, wherein the operation further comprises:

at the designated time, for the given one of the cited documents, re-evaluating the cited reference using the set of annotators to derive a third collection of one or more assertions regarding the cited reference;

comparing the assertions in the first collection of assertions and the assertions in the third collection of assertions to identify any conflicts between the first collection of assertions and the third collection of assertions; and in response to identifying a conflict and without requiring any user input, programmatically notifying the author of the primary research document that the cited research paper has changed.

12. The non-transitory computer-readable medium of claim 11, wherein the set of annotators are composed according to an Unstructured Information Management Architecture (UIMA), wherein the operation further comprises notifying the author of the cited research paper without requiring any user input specifying to notify the author of the cited research paper.

13. A system to monitor documents in a managed research domain to determine whether changes in cited content undermine semantic conformity with citing content, the system comprising:

a computer processor;

a storage repository; and a memory storing a monitor/analyzer tool which, when executed on the computer processor, is configured to perform an operation comprising:

receiving a primary research document to store in a repository provided by the managed research domain;

extracting one or more citations from the primary research document, wherein each extracted citation references a respective one of one or more cited documents;

for each cited document, evaluating content of the cited document using a set of annotators to derive a respective collection of cited assertions from the content of the cited document, wherein the set of annotators includes at least three of: (i) a normalization annotator normalizing the terms in the primary research document and the terms in the one or more cited documents to predefined terms used in a common ontology specific to the managed research domain; (ii) a sentence annotator identifying each sentence in a given document selected from: the primary research document and the one or more cited documents; (iii) a parts-of-speech annotator tagging words in each identified sentence and according to parts-of-speech; (iv) a support annotator identifying references to any documents and further identifying which assertions are supported by the identified references; and (v) a disambiguation annotator evaluating and reconciling results of at least two of the set of annotators;

evaluating content of the primary research document using the set of annotators to derive a collection of citing assertions from the content of the primary research document;

storing the primary research document, each collection of cited assertions, and the collection of citing assertions in the repository provided by the managed research domain;

monitoring for changes to cited content in each cited document, including changes to cited content a first cited document;

for each monitored change to the cited content in the first cited document, determining, based on the derived collections of cited assertions and citing assertions, whether the respective monitored change undermines semantic conformity of the cited content in the first cited document with corresponding, citing content in the primary research document;

upon determining that a first of the monitored changes to the cited content in the first cited document undermines semantic conformity with the citing content, designating the citing content as potentially lacking semantic conformity with the changed, cited content, by annotating the citing content in the primary research document without annotating the changed, cited content in the first cited document;

in response to the designation, generating an alert identifying the citing content and indicating that semantic conformity is undermined;

outputting the alert to an author of the primary research document in order to prompt the author to reapprove at least the citing content in the primary research document in light of the changed, cited content in the first cited document; and removing the designation from the primary research document after receiving, from the author, an indication of reapproval of the citing content in the primary research document.

14. The system of claim 13, wherein at least one of the set of annotators normalizes terms in the primary research document and terms in the one or more cited documents to the common ontology, wherein the author is alerted of the annotation.

15. The system of claim 14, wherein determining that the first monitored change to the cited content undermines semantic conformity with the citing content comprises:

comparing the assertions in the collection of cited assertions of the cited document containing the cited content, and the assertions in the collection of citing assertions to identify any significant conflicts between the collection of cited assertions of the cited document and the collection of citing assertions.

16. The system of claim 15, wherein the indication specifies approval of at least one of: (i) the citing content unaltered in the primary research document in light of the first monitored change; and (ii) an updated version of the citing content in light of the first monitored change; wherein the operation further comprises scheduling each of the one or more cited references for a subsequent re-evaluation at a designated time.

17. The system of claim 16, wherein a given one of the cited documents comprises a cited research paper not written by the author of the primary research paper, wherein the operation further comprises:

at the designated time, for each cited document, re-evaluating the cited reference using the set of annotators to derive a third collection of one or more assertions regarding the cited reference;

comparing the assertions in the first collection of assertions and the assertions in the third collection of assertions to identify any conflicts between the first collection of assertions and the third collection of assertions; and in response to identifying a conflict and without requiring any user input, programmatically notifying the author of the primary research document that the cited research paper has changed.

18. The system of claim 17, wherein the set of annotators are composed according to an Unstructured Information Management Architecture (UIMA), wherein the operation further comprises notifying the author of the cited research paper without requiring any user input specifying to notify the author of the cited research paper.

19. The system of claim 18, wherein each annotator comprises an annotator specific to the managed research domain, wherein the common ontology is specific to the managed research domain, wherein the alert further identifies the cited content, wherein that the first monitored change to the cited content undermines the measure of semantic conformity with the citing content is determined without requiring any user input.

20. The system of claim 19, wherein the changes are monitored by an application having a plurality of components including an annotator creation tool, the set of annotators, an annotator execution engine, and a document evaluation tool, the set of annotators including the set of annotators;

wherein each cited document comprises a respective cited research paper, wherein the first and second collections of assertions includes each of: an assertion of causation, correlation, existence, truth, and falsity, respectively, relative to a concept from the common ontology; wherein each assertion is identified by a respective one of the one or more annotators.

21. The system of claim 20, wherein each of the one or more annotators provide executable or interpretable code that creates annotations describing document content;

wherein the indication specifies approval of, in respective instances: (i) the citing content unaltered in the primary research document in light of the first monitored change; and (ii) the updated version of the citing content in light of the first monitored change.

* * * * *